United States Patent [19]

Sivavec

[11] Patent Number: 5,447,639
[45] Date of Patent: Sep. 5, 1995

[54] METHOD FOR DESTRUCTION OF CHLORINATED HYDROCARBONS IN AQUEOUS ENVIRONMENTS

[75] Inventor: Timothy M. Sivavec, Clifton Park, N.Y.

[73] Assignee: General Electric Company, Schenectady, N.Y.

[21] Appl. No.: 318,151

[22] Filed: Oct. 5, 1994

[51] Int. Cl.$^6$ .............................................. C02F 1/70
[52] U.S. Cl. ................................. 210/747; 210/757; 210/908
[58] Field of Search ............... 210/757, 908, 747, 679, 210/692, 719

[56] References Cited

U.S. PATENT DOCUMENTS

| | | |
|---|---|---|
| 3,640,821 | 2/1972 | Sweeney et al. |
| 3,737,384 | 6/1973 | Sweeney et al. |
| 4,276,179 | 6/1981 | Soehngen ............... 210/692 |
| 4,364,835 | 12/1982 | Cheh ....................... 210/908 |
| 5,068,038 | 11/1991 | Fischer et al. ............ 210/908 |
| 5,266,213 | 11/1993 | Gillham. |
| 5,362,402 | 11/1994 | Haitko et al. ............. 210/757 |

FOREIGN PATENT DOCUMENTS 2238533  6/1991  United Kingdom ............... 210/757

OTHER PUBLICATIONS

Sweeny, K. H., "Reductive Degradation: Versatile, Low Cost" Water & Sewage Works, Jan., 1979, pp. 40–42.

Article—Senzaki, Tetsuo, Removal of Organochloro Compounds by Reduction Treatment (the 2nd report-)—treatment of trichloroethylene with iron powder-, Kogyo Yosui Journal (369), Japan (1989), 37 pages.

Article—R W Gillham et al., Metal–Catalyzed Abiotic Degradation of Halogenated Organic Compounds, Waterloo Centre for Groundwater Research, vol. 29, No. 5, Sep.–Oct. 1991 (2 pages).

*Primary Examiner*—Peter A. Hruskoci
*Assistant Examiner*—Theodore M. Green
*Attorney, Agent, or Firm*—Noreen C. Johnson; James Magee, Jr.

[57] ABSTRACT

A method for the remediation of aqueous solution contaminated with chlorinated aliphatic hydrocarbons. The chlorinated hydrocarbons are reduced to ethane, ethene, and chloride ion. In-situ reactions can take place in a ditch or screened well. Ex-situ reactions can take place in columns packed with ferrous sulfide.

10 Claims, No Drawings

METHOD FOR DESTRUCTION OF CHLORINATED HYDROCARBONS IN AQUEOUS ENVIRONMENTS

FIELD OF THE INVENTION

The present invention relates to a method for dehalogenation of aqueous compositions contaminated with halogenated hydrocarbons, and more particularly, relates to dechlorination of chlorinated aliphatic hydrocarbons using iron sulfide.

BACKGROUND OF THE INVENTION

Polychlorinated hydrocarbons, such as carbon tetrachloride, chloroform, trichloroethylene, and tetrachloroethylene have been widely used as chemical intermediates, solvents for dry cleaning of clothing, in degreasing operations, and in a variety of other applications. Chlorinated hydrocarbons are very stable compounds and are relatively toxic at low levels. Groundwaters have become contaminated by chlorinated hydrocarbons from sources such as disposal facilities, chemical spills, and leaking underground storage tanks.

Due to this fact, chlorinated hydrocarbons have been accumulating in the environment, particularly in groundwaters. As a result, pollution of water by chlorinated hydrocarbons as become an important environmental problem and contaminated groundwaters represent a large portion of environmental remedial action plans throughout the world. This is partially due to the improved analytical techniques used for detection of chlorinated hydrocarbons in many water supplies.

It is known that chlorinated compounds can be degraded by reductive dechlorination, that is, replacement of chlorine substituents by hydrogen. Metallic elements, such as iron and zinc, have been used to degrade chlorinated organic compounds.

In the patent literature, patents are issued that use metals or metallic couples to degrade chlorinated organic compounds. In U.S. Pat. No. 3,640,821 to K. H. Sweeney and J. R. Fischer, metallic zinc is used for removing pesticides from aqueous solutions. U.S. Pat. No. 3,737,384, also to Sweeney and Fischer, discloses the use of metallic couples, in solutions buffered to near neutral pH for the degradation of pesticides.

More recently, researchers in Japan have reported on the degradation of 1,1,2,2-tetrachloroethane and trichloroethylene in aqueous solution in the presence of iron powder: Senzaki, T. and Y. Kumagai, "Removal of Chlorinated Organic Compounds from Wastewater by Reduction Process: II. Treatment of Trichloroethylene with Iron Powder" Kogyo Yosui, 1989, 369, 19–25. Gillham and O'Hannesin in their article "Metal-Catalyzed Abiotic Degradation of Halogenated Organic Compounds" IAH Conference on Modern Trends in Hydrogeology: Hamilton, Ontario, May 10–13, 1992, have confirmed Senzaki's results. Recently, Gillham received a U.S. Pat. No. 5,266,213, for his method for cleaning halogenated contaminants from groundwater. The process involves feeding contaminated groundwater through a trench containing a metal such as iron, under strict exclusion of oxygen, and over a lengthy period of time.

The above-mentioned metal systems show the reductive dechlorination of hydrocarbons in aqueous solutions by iron metal. They are disadvantaged in that large amounts of iron are needed for completion of the reactions, as well as, substantial periods of reaction time are required. There is still a need for remediation processes to effectively clean-up aqueous solutions contaminated with chlorinated hydrocarbons.

SUMMARY OF THE INVENTION

The present invention provides a novel method for enhanced remediation of contaminated aqueous solutions contaminated with chlorinated aliphatic hydrocarbons which comprises reacting reductively the chlorinated hydrocarbons with ferrous sulfide thereby generating innocous byproducts, such as ethane, ethene, and chloride ion. Chlorinated aliphatic hydrocarbons, including trichloroethylene (TCE), tetrachloroethylene, and chlorinated ethanes, such as 1,1,1-trichloroethane, are reduced to ethene, ethane, and chloride ion ($Cl^{-1}$) when contacted with commercial iron (II) sulfide under aerobic and anaerobic conditions. The reaction proceeds, in situ or ex situ, by a mechanism in which sulfide in ferrous sulfide functions as the reducing agent and is oxidized to sulfate ($SO_4^{-2}$) while the oxidation state of iron remains unchanged. Sulfur is the electron transfer site at the ferrous sulfide-water interface.

The reaction of this invention can be buffered or unbuffered. The pH range is between about 3.0–11.0 for unbuffered reactions and between about 5.0–9.0 for buffered reactions.

The present invention also comprises a method for dechlorination of contaminated aqueous compositions, contaminated with chlorinated aliphatic hydrocarbon compounds, said method comprising admixing an effective amount of ferrous sulfide with the contaminated aqueous compositions at a temperature above about 4° C. to generate ethane, ethene, and chloride ion. By an "effective amount" of ferrous sulfide is meant an amount to completely reduce the chlorinated aliphatic hydrocarbons to ethane, ethene, and chloride ion.

In the practice of this invention, granular ferrous sulfide may be filled into a pit, ditch, screened well, or trench and used to react with and degrade chlorinated aliphatic compounds in a migrating plume, such as groundwater aquifiers and drainage runoffs. Alternatively, the present invention may be operated by packing a column with ferrous sulfide. Industrial wastewater or pumped groundwater may be treated in this manner, and other contaminated solutions. Additionally, an inert filler, such as sand, gravel, pebbles, and the like, may also be added to the ferrous sulfide to increase the hydraulic conductivity of the reaction zone between the chlorinated hydrocarbons and the ferrous sulfide. Polymeric sorbents, such as, but not limited to, polyethylene, polypropylene., thermoplastic elastomers, and carbon-filled rubbers, may also be admixed with the granular ferrous sulfide.

DETAILED DESCRIPTION OF THE INVENTION

This invention relates to a process for cleaning groundwater and wastewater contaminated with chlorinated solvents such as trichloroethylene (TCE), dichloroethylene (DCE), vinyl chloride (VC), tetrachloroethylene (PCE), dichloroethane, trichloroethane, carbon tetrachloride, dichloromethane, chloroform, and the like. Dechlorination of these solvents in the vapor phase may also be achieved. Vapor phase capture and destruction of chlorinated solvents finds application in the treatment of airstreams emanating from air strippers and soil vapor extraction wells.

In one embodiment of the invention, commercial ferrous sulfide (FeS) would be filled into a trench or screened well to intercept an aqueous stream contaminated with chlorinated hydrocarbons. The quantity of the ferrous sulfide is based on the size of the trench and the flow of the stream. One skilled in the art would utilize common engineering principles to calculate the size of the trench for the quantity of water passing through. The greater the amount of ferrous sulfide present in the trench leads to a faster rate of dechlorination, but no minimal amount is specified. Basically, the manner in which the present invention operates in a trench, is that the ferrous sulfide provides a permeable, reactive wall through which an aqueous stream can flow. The dimensions of the trench containing the ferrous sulfide are designed so as to afford an optimal residence time during which the chlorinated solvents would fully degrade to ethane, ethene and chloride ion. A granular or sufficiently coarse ferrous sulfide would be used so that groundwater flow would not be impeded. Sand or another coarse, inert filler material may also be added to the ferrous sulfide to provide less resistance to groundwater flow. This description of the invention is suited for in-situ contaminated streams.

In another embodiment of the present invention, an ex-situ application can be practiced. Here, a column would be packed with the ferrous sulfide or a mixture of ferrous sulfide and sand, or .like inert filler material. Groundwater or industrial wastewater would then be passed through this packed column. Column dimensions and water input flow are chosen to provide an optimal residence time during which the chlorinated solvents would be fully degraded.

The following examples further demonstrate the present invention.

EXAMPLE 1

To a sufficient number of 120 milliliters borosilicate glass serum bottles were added 25.0 grams granular ferrous sulfide and 100 milliliters of an aqueous trichloroethylene solution at a buffered range of about pH 7.0, buffered with 40 milligrams calcium carbonate, and spiked with 23.1 parts per million trichloroethylene. The bottles containing approximately ten cubic centimeters headspace were capped with Teflon-lined septa and sealed with an aluminum crimp cap.

A second series of experiments were also performed in which no headspace was present in the vials. A sufficient number of vials were prepared to accommodate six sample times (3,6,24,30,48, and 54 hours). All vials were sampled in a sacrificial manner. Control experiments were also run in which no ferrous sulfide was added and in which no trichloroethylene was added. The vials were rolled on a jar mill at 35 revolutions per minute to fully suspend the ferrous sulfide in the aqueous phase. All experiments were conducted at ambient temperatures (25° C.).

Headspace and hexane extracts of the settled aqueous phase were analyzed by gas chromatography employing a $^{63}$Nickel electron-capture detector (DB-1(methyl-silicone) capillary column: 30 meters times 0.32 millimeters i.d. 1 μm film thickness; detector temperature 375° C.; temperature program 50° C. for two minutes, 20° C. per minute to 120° C., 120° C. for five minutes).

Trichloroethylene calibration standards were analyzed and calibration curves generated for concentrations ranging from 20 parts per billion to 50 parts per million. Dichloroethylene and vinyl chloride were also calibrated on the GC-ECD. The following GC retention times were measured: trichloroethylene 5.71 minutes, 1,1,-dichloroethylene 3.27 minutes, transdichloroethylene 3.68 minutes, cis-dichloroethylene 4.11 minutes, and vinyl chloride 2.2 minutes. Aliquots (5.0 milliliters) of the aqueous solution were removed from the vials at selected sample times via gas-tight syringe and were extracted with an equal volume of high resolution GC grade n-hexane prior to GC-ECD analysis.

The aqueous phase was also analyzed by purge-and-trap GC-FID using a Tekmar purge-and-trap concentrator and a Tekmar ALS 2016 autosampler. A PLOT fused silica $Al_2O_3/Na_2SO_4$ analytical column was used to achieve separation of C1-C5 hydrocarbon gases. The following GC temperature program was used: 75° C. for 5 minutes, 20° C./minute to 200° C., 200° C. for ten minutes. The following GC retention times were measured: methane 2.39 minutes, ethane 2.58 minutes, ethene 2.79 minutes, and ethyne 6.25 minutes. Samples of the settled aqueous phase were withdrawn by gas-tight syringe and loaded directly onto the Tekmar 2016 autosampler. Methane, ethane, ethene, and ethyne were calibrated from a six-component mixture in nitrogen by a direct injection method. The overhead space in each vial was sampled directly via a gas-tight syringe and analyzed by GC-ECD and GC-mass spectrometry. All sampled vials were sacrificed for chloride ion or pH measurements of the aqueous phase.

Chloride ion analysis was conducted by ion chromatography. A method detection limit of 0.03 parts per million chloride ion was measured. pH measurements were conducted using a combination pH/reference electrode, standardized with pH 4, 7, and 10 buffers.

The aqueous trichloroethylene concentration data at selected reaction times, expressed in terms of parts per million (ppm) is shown in Table 1. Concentrations of chloride ion, expressed in terms of ppm $Cl^-$ and % mass balance, and pH measurements are also shown. Concentrations of dichloroethylene and vinyl chloride resulting from degradation of trichloroethylene are also displayed. Ethane and ethene were the only C1-C6 hydrocarbons identified by purge-and-trap GC-FID analysis of the aqueous phase and GC-FID overhead space analysis.

TABLE 1

Loss of Trichloroethylene and Generation of Chloride Ion (pH adjusted to 7 by 40 mg $CaCO_3$; 25° C.; 100 ml aq. TCE-25.0 g ferrous sulfide)

| | 25.0 grams ferrous sulfide | | | | No ferrous sulfide | | |
|---|---|---|---|---|---|---|---|
| Time hours | TCE ppm | $Cl^-$ ppm | $Cl^-$ mass balance % | pH | TCE ppm | $Cl^-$ ppm | pH |
| 0 | 23.1 | <0.03 | — | 7.0 | 23.1 | <0.03 | 7.0 |
| 3 | 6.61 | — | — | 6.1 | 23.08 | <0.03 | 7.1 |
| 6 | 5.22 | — | — | 6.1 | 23.07 | <0.03 | 7.0 |
| 24 | 2.19 | 4.55 | 27 | 6.1 | 23.22 | <0.03 | 7.1 |
| 30 | 1.81 | 5.44 | 32 | 6.2 | 23.12 | <0.03 | 7.1 |
| 48 | 1.46 | 6.19 | 35 | 6.1 | 23.11 | <0.03 | 7.2 |
| 54 | 1.09 | 6.24 | 35 | 6.2 | 23.08 | <0.03 | 7.2 |

EXAMPLE 2

The following example illustrates reductive dechlorination of aqueous TCE under anaerobic conditions. Borosilicate glass serum bottles were acid-washed, oven dried and placed in an anaerobic glovebox to outgas for 3 days. Ferrous sulfide was weighed into the vials. A solution of Milli-Q water buffered with 40 mg/L CaCO₃ was filtered through a sterile 0.2-μm nylon filter and sparged with the glovebox atmosphere for a minimum of 30 minutes.

The vials were filled and an aqueous TCE solution was spiked into each vial to generate a 20.4 ppm aqueous TCE solution. The vials were capped with Teflon-lined septa and sealed with an aluminum crimp cap. Six vials were prepared to accommodate six sample times, as in example one. The sampling of the vials and subsequent analysis was performed as in example 1. The results are displayed in Table 2.

TABLE 2

Loss of TCE and Generation of Chloride Ion at Ambient Temperature (Anaerobic)
(Milli-Q Water buffered with 40 mg/L CaCO₃, initial pH adjusted to 7 by $CO_2$
100 mL aq. TCE - 25.0 g ferrous sulfide)

| | 25.0 grams FeS | | | | No FeS | | |
|---|---|---|---|---|---|---|---|
| time h | [TCE] ppm | [Cl−] ppm | Cl− mass balance, % | pH | [TCE] ppm | Cl− ppm | pH |
| 0 | 20.40 | <0.03 | — | 7.0 | 20.46 | <0.03 | 7.0 |
| 3 | 7.60 | — | — | 6.6 | 20.30 | <0.03 | 7.0 |
| 6 | 5.76 | — | — | 6.5 | 20.12 | <0.03 | 6.9 |
| 24 | 3.85 | 5.06 | 38 | 6.6 | 20.98 | <0.03 | 7.0 |
| 30 | 2.15 | 5.79 | 39 | 6.9 | 21.13 | <0.03 | 6.9 |
| 48 | 1.96 | 6.79 | 45 | 6.5 | 20.18 | <0.03 | 6.9 |
| 54 | 1.74 | 7.36 | 49 | 6.4 | 20.43 | <0.03 | 7.1 |

EXAMPLE 3

The following example illustrates the dechlorination activity of ferrous sulfide towards isomers of dichloroethylene (cis-DCE, trans-DCE and 1,1-DCE). To a sufficient number of 120 mL borosilicate glass serum bottles were added 25.0 g granular ferrous sulfide (Fisher Scientific) and 100 mL of aqueous DCE solutions (Milli-Q filtered, deionized water buffered with 40 mg/L CaCO₃ ($CO_2$ addition to achieve pH 7.0). The initial DCE concentrations were 11.1 ppm cis-DCE, 5.7 ppm trans-DCE and 1.9 ppm 1,1-DCE. The vials contained approximately cc headspace and were capped with Teflon-lined septa and sealed with an aluminum crimp cap.

A sufficient number of vials were prepared to accommodate three sample times (3, 6 and 24). All vials were sampled in a sacrifical manner. Control experiments were also run in which no ferrous sulfide was added and in which no DCE was added. The vials were rolled on a jar mill at 35 rpm to fully suspend the ferrous sulfide in the aqueous phase. All experiments were conducted at ambient temperatures (25° C.). Sampling and analysis were performed as described in example 1. Table 3 shows the results.

TABLE 3

Loss of DCE and Generation of Ethene-Ethane and Chloride Ion at Ambient Temperature (Aerobic)
(Milli-Q Water buffered with 40 mg/L CaCO₃, initial pH adjusted to 7 by $CO_2$
100 mL aq. DCE - 25.0 g ferrous sulfide (Fisher Scientific))

| time h | [DCE] ppm | C/Co | pH | [Cl−] μg/g | Cl− mass balance, % | [Fe II, III] soluble μg/g | [Fe II, III] total μg/g | $SO_4^{2-}$ μg/g | ethane, ethene μmol |
|---|---|---|---|---|---|---|---|---|---|
| cis-DCE | | | | | | | | | |
| 0 | 11.10 | 1.000 | 7.0 | <0.03 | — | — | — | — | — |
| 3 | 2.69 | 0.242 | 6.2 | — | — | — | — | — | — |
| 6 | 2.16 | 0.194 | 6.1 | — | — | — | — | — | 0.17, 0.07 |
| 24 | 2.19 | 0.197 | 6.1 | 4.38 | 67.2 | 2151 | 2168 | 4620 | — |
| trans-DCE | | | | | | | | | |
| 0 | 5.70 | 1.000 | 7.0 | <0.03 | — | — | — | — | — |
| 3 | 3.10 | 0.544 | 6.2 | — | — | — | — | — | — |
| 6 | 2.99 | 0.524 | 6.2 | — | — | — | — | — | 0.40, 0.18 |
| 24 | 1.83 | 0.321 | 6.3 | 1.46 | 51.6 | 2120 | 2382 | 4049 | — |
| 1,1-DCE | | | | | | | | | |
| 0 | 1.90 | 1.000 | 7.0 | <0.03 | — | — | — | — | — |
| 3 | 0.71 | 0.374 | 6.3 | — | — | — | — | — | — |
| 6 | 0.65 | 0.342 | 6.3 | — | — | — | — | — | 0.03, 0.04 |
| 24 | 0.23 | 0.121 | 6.3 | 0.60 | 49.1 | 2174 | 2382 | 4507 | — |

C/Co represents DCE concentration at a given time divided by the initial DCE concentration.

EXAMPLE 4

Dechlorination of TCE in Groundwater by Ferrous Sulfide in a Continuous-Flow Column The following continuous flow column experiment was conducted in a 1×12 in. glass chromatography column wet-packed with 501.3 g ferrous sulfide (Fisher Scientific Co.) The aqueous pore volume in the packed column measured 23.3 cc. The column was capped with 10–20 μm glass frits (1 in. diam.) and Teflon end caps connected to ⅛ in. Teflon tubing and pressure gauges before and after the column. Approximately 2 L deionized water was passed through the column by means of a Teflon diaphragm pump at 4 mL/min (8 h). Flow direction was from bottom to top.

Groundwater was spiked with TCE to 2.64 mg/L. The groundwater had an initial pH of 7.34 and a chloride ion concentration of 102.2 ppm. The input TCE concentration and output TCE/DCE/VC were measured at 6 h intervals by GC-ECD as described in example 1. Ethane, ethene and C3-C6 hydrocarbons were quantified by the purge-and-trap GC-FID method described in example 1. Output chloride ion concentration and output pH were also measured at every sampling interval. A TCE half-life of 7.22 min (rate constant 0.0960 $min^{-1}$) was measured under these steady-state column conditions. Chloride ion mass balance varied between 93 and 149%. Ethene/ethane mass balance varied between 27–104%.

A second column study was performed in which the input flow rate was set at 5.0 mL/min for 24, then increased to 10.0 mL/min for 18 h, then increased further to 20.0 mL/min for 10 h. The input TCE concentration was 1.25 mg/L and the input cis-DCE concentration was 0.74 mg/L.

An average TCE dechlorination half-life of 8.5 min (k=0.0811) was determined from the plot of ln(C/Co) versus column residence time at input flow rates ranging from 4.0 mL/min to 10.0 mL/min.

What is claimed is:

1. A method for dechlorination of contaminated aqueous compositions, contaminated with chlorinated aliphatic hydrocarbon compounds, said method comprising reacting an effective amount of ferrous sulfide with the contaminated aqueous compositions at a temperature above about 4° C. until the chlorinated aliphatic hydrocarbon compounds are completely dechlorinated thereby generating ethane, ethene, and chloride ion.

2. A method according to claim 1 where the chlorinated aliphatic hydrocarbons are selected from the group consisting of trichloroethylene, dichloroethylene, vinyl chloride, tetrachloroethylene, dichloroethane, trichloroethane, carbon tetrachloride, dichloromethane, and chloroform.

3. A method according to claim 1 where the pH of the reaction is between about 3.0 and 11.0.

4. A method according to claim 1 where the reaction is unbuffered.

5. A method according to claim 1 where the reaction is buffered at a pH range between about 5.0–9.0.

6. A method according to claim 1 where said contaminated aqueous solution is groundwater.

7. A method according to claim 1 where said contaminated aqueous solution is industrial wastewater.

8. A method according to claim 1 where said reaction takes place in-situ in site selected from the group consisting of a ditch, pit, trench, and screened well.

9. A method according to claim 8 where said ferrous sulfide is admixed with a filler selected from the group consisting of sand, gravel, pebbles, polyethylene, polypropylene, thermoplastic elastomers, and carbon-filled rubbers, and said admixture is reacted in-situ.

10. A method according to claim 1 where said reaction takes place ex-situ in a column packed with ferrous sulfide and a filler selected from the group consisting of sand, gravel, pebbles, polyethylene, polypropylene, thermoplastic elastomers, and carbon-filled rubbers.

* * * * *